US012768334B1

(12) United States Patent
De Mendoza et al.

(10) Patent No.: US 12,768,334 B1
(45) Date of Patent: Oct. 20, 2026

(54) WIND TURBINE BLADE DAMAGE AND DEFECT DETECTION SYSTEM AND METHOD

(71) Applicant: INVENERGY RENEWABLES LLC, Chicago, IL (US)

(72) Inventors: Axel De Mendoza, Chicago, IL (US); Zoe Kimpel, Chicago, IL (US); Sophia Logan, Chicago, IL (US)

(73) Assignee: INVENERGY RENEWABLES LLC, Chicago, IL (US)

( * ) Notice: Subject to any disclaimer, the term of this patent is extended or adjusted under 35 U.S.C. 154(b) by 0 days.

(21) Appl. No.: 19/320,469

(22) Filed: Sep. 5, 2025

(51) Int. Cl.

| | |
|---|---|
| ***F03D 17/00*** | (2016.01) |
| ***G06V 10/25*** | (2022.01) |
| ***G06V 10/26*** | (2022.01) |
| ***G06V 10/764*** | (2022.01) |
| ***G06V 10/774*** | (2022.01) |
| ***G06V 10/82*** | (2022.01) |

(Continued)

(52) U.S. Cl.
CPC ......... *F03D 17/028* (2023.08); *F03D 17/003* (2023.08); *F03D 17/013* (2023.08); *G06V 10/25* (2022.01); *G06V 10/26* (2022.01); *G06V 10/764* (2022.01); *G06V 10/7747* (2022.01); *G06V 10/82* (2022.01); *G06V 10/993* (2022.01); *G06V 20/70* (2022.01)

(58) Field of Classification Search
CPC .... F03D 17/028; F03D 17/003; F03D 17/013; G06V 10/25; G06V 10/26; G06V 10/764; G06V 10/7747; G06V 10/82; G06V 10/993; G06V 20/70
See application file for complete search history.

(56) References Cited

U.S. PATENT DOCUMENTS 10,475,174 B2 11/2019 Lim et al.
10,504,220 B2 12/2019 Lim et al.
(Continued)

FOREIGN PATENT DOCUMENTS

| | | | |
|---|---|---|---|
| JP | 2024-109413 A | 8/2024 | |
| KR | 102386221 B1 * | 4/2022 | ........... G06N 3/0464 |
| WO | 2022/077605 A1 | 4/2022 | |

OTHER PUBLICATIONS

He, Kaiming, et al. "Mask r-cnn." Proceedings of the IEEE international conference on computer vision. 2017 (Year: 2017).*

*Primary Examiner* — Oneal R Mistry
*Assistant Examiner* — Jongbong Nah
(74) *Attorney, Agent, or Firm* — SQUIRE PATTON BOGGS (US) LLP

(57) ABSTRACT

Wind turbine blade damage and defect detection systems and methods employ large datasets of wind turbine blade images containing labeled examples of types of damage, whether actual or potential, to train a machine learning model to identify such types of damage. The labeled examples facilitate future identification and delineation of damage to wind turbine blades. The trained machine learning model can process much larger volumes of wind turbine blade images much more quickly than humans can, so as to provide meaningful analysis of data to enable identification of nascent blade damage situations. Selection of machine learning models and tools to train such systems improve the operation of the underlying hardware and software through more efficient, more accurate damage and defect detection performance.

20 Claims, 5 Drawing Sheets

(51) Int. Cl.
*G06V 10/98* (2022.01)
*G06V 20/70* (2022.01)

(56) References Cited

U.S. PATENT DOCUMENTS

| | | | | |
|---|---|---|---|---|
| 10,860,836 | B1 * | 12/2020 | Tyagi | G06V 10/454 |
| 2018/0293734 | A1 * | 10/2018 | Lim | G06V 10/82 |
| 2018/0342069 | A1 * | 11/2018 | Lim | G06T 7/0008 |
| 2019/0244375 | A1 * | 8/2019 | Choi | A47L 15/4295 |
| 2021/0350521 | A1 * | 11/2021 | Bach-Andersen | F03D 80/50 |
| 2021/0374928 | A1 * | 12/2021 | Hida | G06F 18/2148 |
| 2023/0022631 | A1 * | 1/2023 | Rothmund | G06T 7/0004 |

* cited by examiner

WIND TURBINE BLADE DAMAGE AND DEFECT DETECTION SYSTEM AND METHOD

FIELD OF THE INVENTION

Aspects of the present invention relate to wind turbines, more particularly to wind turbine blade damage and defect detection, and yet more particularly to wind turbine blade damage and defect detection using machine learning.

BACKGROUND OF THE INVENTION

Utility scale wind turbine projects can take 3 to 5 years from planning to building. Up time for wind turbines and wind turbine farms is important, particularly in instances in which the wind turbines are the primary source of power, as is expected increasingly to be the case.

The costs of shutting down one or more wind turbines for major repair or replacement blade(s) can pile up quickly and substantially. Accordingly, it is important to be able to identify damage accurately and promptly. It also is important to be able to identify damage when it is minor and easily repaired. Even if a blade needs to be replaced, doing so before the blade gets so damaged as to possibly put the rest of the wind turbine in imbalance and stress the internal workings of the wind turbine can significantly reduce repair costs and/or engineering time.

Presently, drones capture wind turbine blade images which engineers inspect to identify various types of damage, including cracks, delamination, impact, holes, and different kinds of erosion. The images may be taken from various angles and distances, and may focus on particular parts of a blade, for example, a leading edge or a front surface, or portions thereof. The volume and type of images that drones can provide far exceeds what an engineer or even a team of engineers can review efficiently.

There are known examples of wind turbine blade damage and defect detection techniques. Some such techniques involve the use of machine learning models trained on wind turbine blade damage data. Such systems may be limited because of poor quality of data on which the systems have been trained, or poor quality or technical unsuitability of the machine learning model(s) itself, among other causes. In view of these limitations, it would be desirable to provide a wind turbine blade damage and defect detection system and method that accurately identifies and categorizes actual, developing, or possible damage to wind turbine blades in operation.

SUMMARY OF THE INVENTION

Embodiments of the present invention provide wind turbine blade damage and defect detection systems and methods that employ large datasets of labeled examples of types of damage, whether actual or potential, and categorize those labeled examples so as to facilitate future identification and delineation of damage to wind turbine blades. The inventive systems and methods, trained using such datasets, can process much larger volumes of blade images much more quickly than humans can, so as to provide meaningful analysis of data to enable identification of nascent blade damage situations before they can become serious. In embodiments, the ability to process multiple views of turbine blades taken at the same time can contribute to this meaningful analysis. In some instances, wind turbine shutdown in response to detection of certain types of damage can prevent more serious damage to wind turbine blades, and even to the wind turbines themselves (for example, by avoiding potentially damaging instances of imbalance). Selection of machine learning models and tools to train such systems improve the operation of the underlying hardware and software through more efficient, more accurate damage and defect detection performance.

Ordinarily skilled artisans will appreciate that the embodiments described herein are applicable not only to onshore wind turbines but also to offshore wind turbines.

BRIEF DESCRIPTION OF THE DRAWINGS

Aspects of the present invention now will be described in detail with reference to the accompanying drawings, in which.

DETAILED DESCRIPTION

Embodiments of the present invention identify damage or potential damage to wind turbine blades, allowing engineers or other image evaluators to examine only a subset of the vast volume of images that the invention embodiments process, thereby decreasing the volume of manual drone image review significantly, while raising the likelihood of identifying instances of nascent blade damage sufficiently quickly to enable prompt undertaking of any necessary repair or replacement. This increase in efficiency reduces the risk of damage that requires shutting down the turbine or replacing major components, saving meaningful amounts in lost power production, replacement costs and engineering time. The decreased downtime for wind turbines and wind turbine farms increases power production at decreased costs.

Figure 1:
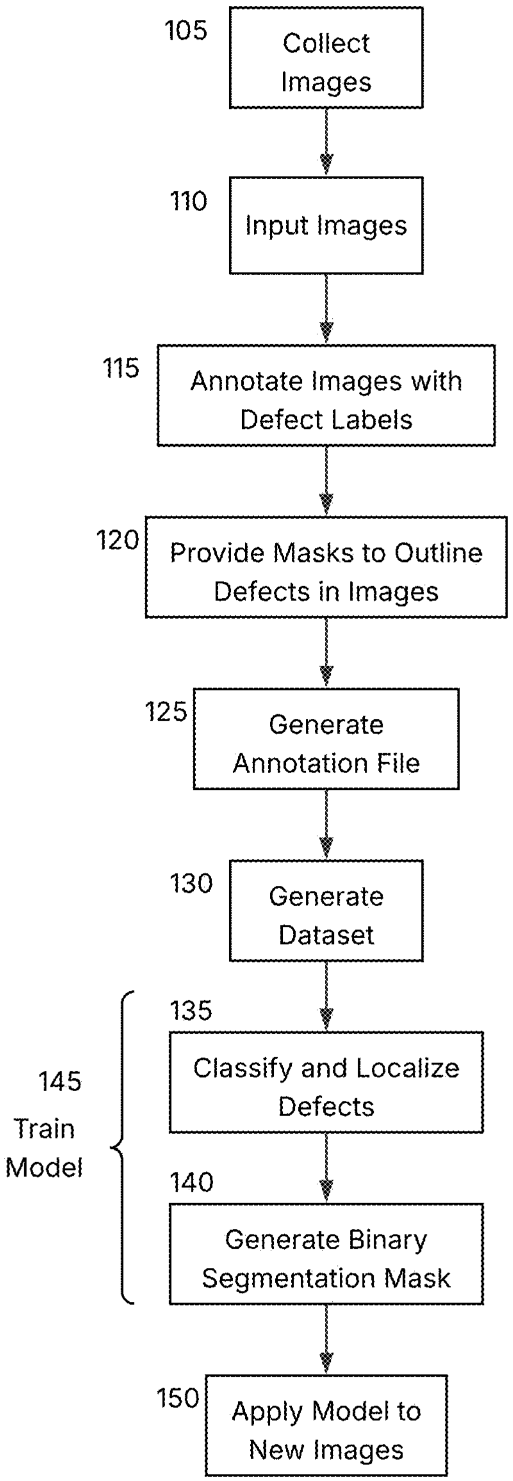
FIG. 1 is a high level flowchart depicting training and use of a machine learning model according to an embodiment.

FIG. 1 depicts a high level flowchart of training of a machine learning model used in turn to identify defects and/or damage in wind turbine blades. At 105, images may be collected, from drone images, ground images, one or more existing databases, or other sources that are known to ordinarily skilled artisans. In embodiments, drones may be programmed to obtain photographs of wind turbine blades at different perspectives, angles, and/or altitudes. In embodiments, images may be manipulated by applying one or more transformations, such as mirroring, rotating, smoothing, re-scaling (either magnifying or reducing), contrast reduction, and/or inversion (for example, horizontal and/or vertical flipping). Such manipulation can be used to generate additional images for the image collection and to make the machine learning model more effective on images with backgrounds and terrain not represented in the training data. In embodiments, any of these manipulation types may be used separately, or together. In embodiments, an individual manipulation type and/or combined manipulation types may be applied to random images in the training set. Any or all of these types of images, manipulated or unmanipulated, in the above-described terrain and/or weather and/or atmospheric conditions may be included in training sets.

Depending on the embodiment, the training sets may include images taken at a wide variety of locations with different appearances; images taken under a wide variety of weather and/or atmospheric conditions; images of a wide variety of different wind turbines and wind turbine blades; images of wind turbines and wind turbine blades from different manufacturers; images of wind turbines of varying sizes, including utility-scale wind turbines of varying sizes and power production capability; and/or images of onshore and/or offshore wind turbines and wind turbine blades. In different embodiments, the imaged wind turbines may be in different terrains, ranging from plains (with and/or without vegetation, such as crops, trees, and the like), to mountains (including snow-covered and/or non-snow-covered), to desert, to seas of varying conditions (e.g. choppy, smooth) in the case of offshore wind turbines. In embodiments, weather and/or atmospheric conditions may include daytime, midday, dawn/dusk, clear skies, sunny skies, cloudy skies, drought, fog, rain, wet snow, dry snow, sleet, and/or freezing rain.

At 110, the collected images may be input into the machine learning model. At 115, the input collected images may be annotated with defect labels, identifying defects such as the ones described above. In embodiments, certain types of blade damage representing greater severity, greater risk, or greater probability of occurrence may be included in training sets as additional samples, for over-sampling of these conditions. An advantage of this over-sampling is to optimize the models for accuracy in detecting similar blade damage, whose severity lead to largest repairs and greatest downtimes, under a wider variety of conditions.

At 120, in an embodiment, technically qualified people, for example, blade engineers, may label defects and damage in each image. The labeling may be done using various kinds of annotation software. In an embodiment, a defect, or damage, may be outlined using bounding boxes, polygons, or masks, depending on the level and type of detail desired.

At 125, in an embodiment, the labeling software may generate a JavaScript Object Notation (JSON) file containing image metadata, polygon coordinates, bounding box data, and associated damage categories. In different embodiments, different file formats may be used, including but not limited to Extended Markup Language (XML), Yet Another Markup Language (YAML), Protocol Buffers (ProtoBuf), and MessagePack.

At 130, in an embodiment, the output annotation file may be used to initialize a custom dataset build, including without limitation a PyTorch Dataset class, which parses the bounding boxes, masks, and labels, converting them into tensor formats compatible with the object detection and instance segmentation pipeline of the dataset building tool being used. In an embodiment, other frameworks, such as TensorFlow or Keras, may be used as an alternative to PyTorch. In an embodiment, other computer vision pipelines such as classification, classification and localization, or semantic segmentation may be used as alternatives to object detection or instance segmentation. These are merely nonlimiting examples. Ordinarily skilled artisans will appreciate that other machine learning model building frameworks may be employed, depending on the embodiment and on the application.

In embodiments, the resulting training dataset may be used for machine learning model training 145. In an embodiment, at 135 a prediction model such as a Fast R-CNN predictor may be used to classify and localize defects. At 140 a Mask R-CNN predictor may be used to generate binary segmentation masks, to define regions of interest (RoIs) in an image. In an embodiment, these binary masks may consist of two pixel values, one value representing pixel background, and one value representing the foreground or object of interest. These are merely nonlimiting examples. Ordinarily skilled artisans will appreciate that other machine learning pre-trained models may be employed, depending on the embodiment and on the application.

Once the model is trained, then at 150 the model may be applied to new images to identify, classify, and localize wind turbine blade defects in each image.

Figure 2:
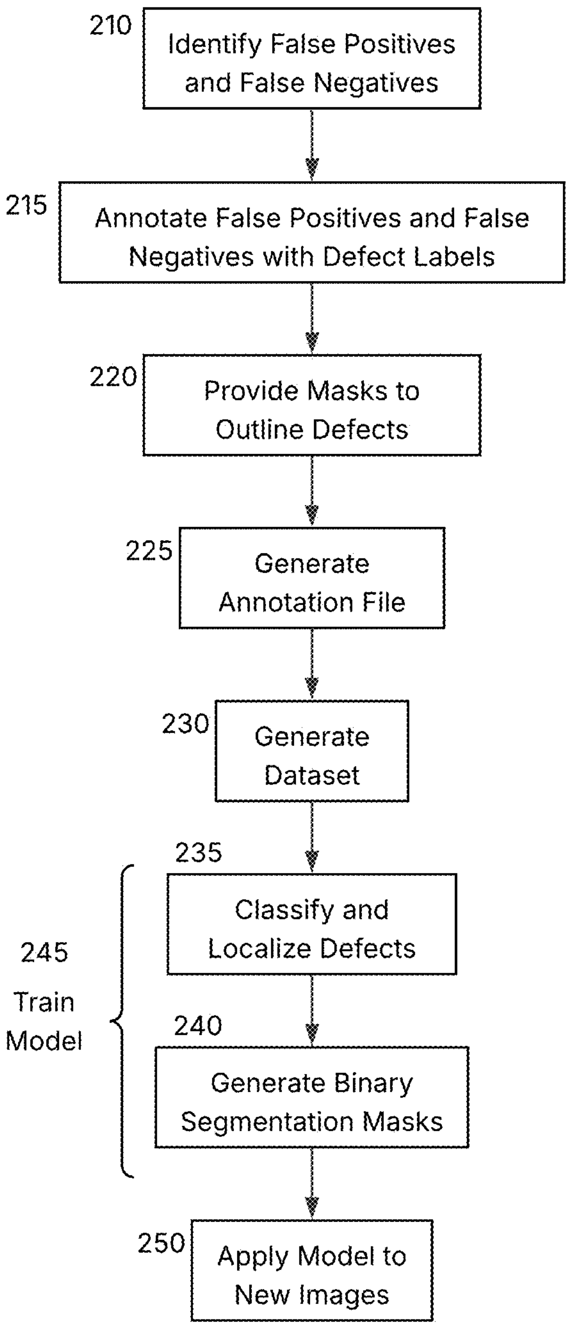
FIG. 2 is another high level flowchart depicting additional training and use of a machine learning model according to an embodiment.

Sometimes, model training 145 may be incomplete or inaccurate because of relatively large numbers of false positives (signifying a defect where there is none) or false negatives (signifying no defect where there is one). Accordingly, in an embodiment, a second training phase may be provided to train on images known to provide false positives (no damage where damage is identified), to train the models more robustly. In an embodiment, a third training phase may be provided to train on images known to provide false negatives (damage where no damage is identified), to train the models more robustly. In an embodiment, both second and third training phases may be provided, to train the models even more robustly. FIG. 2 shows an example of such training. The flow in FIG. 2 is similar to that of FIG. 2, with 215-250 in FIG. 2 corresponding generally to 115-150 in FIG. 1. One difference between FIG. 1 and FIG. 2 is that at 210, images that yielded false positives and false negatives are identified. It is these images that are input and annotated for further training.

Once the model is trained, the model can be deployed to process new sets of images, or individual images, as desired, and can detect and segment possible damage to a wind turbine blade. In an embodiment, the images may be input to the model automatically in batches. For example, where there are a number of images of a particular wind turbine blade, the images may be input as a batch to facilitate analysis of the particular blade. Alternatively, images may be input and processed individually to address a particular concern.

There are various types of blade damage for which monitoring may be useful. In different embodiments, these types of blade damage may be categorized in different ways. There may be numerous different categories. In some embodiments, two or more categories may be combined. In an embodiment, categories of blade damage may include:

- Fatigue: The materials in wind turbine blades can wear out or otherwise fatigue from constant use, and can cause a number of the types of damage below. Fatigue can occur at a blade's leading edge, or in the blade's main body.
- Cracks: This type of damage can have various causes. For example, there may be fatigue in a wind turbine blade; there may be failures in the composite materials in the blade, leading to cracking of one or more of the layers, or crushing of reinforcing fibers in the blade.
- Impact: This type of damage may result in some kinds of erosion, depending on the size and frequency of objects striking a wind turbine blade. Impact could come from avian strikes, hail or freezing rain, or sand or the like striking the blade.
- Delamination: This type of damage may lead to cracks. Delamination can result from two or more layers of a composite material detaching from each other.

Leading Edge Erosion: This type of damage occurs on the leading edge of wind turbine blades, and in that respect differs from the impact damage described above. This can come from rain impact, or from impact from small objects, from sand, hail, or other small particles.

Holes: This type of damage can occur from hard precipitation or avian collisions. Where wind turbines are in areas where tornadoes appear, or other high winds (for example, gale force winds at sea), flying debris of various sizes can strike wind turbine blades and cause damage.

Splits: This type of damage can occur at blade tips, or in the laminate on the blade surface. Similar to (but different from) delamination, the skin on the blade surface may buckle because of damage of the bond between the skin and the main spar of the blade, for example. Lightning strikes can be a cause of splits. A lightning strike may heat the air inside a rotor blade, causing the air to expand and generate internal pressure. Additionally, condensed moisture inside the blade, which may evaporate because of the heat of the lightning strike, can exacerbate this phenomenon.

Lightning Strikes: Lightning strikes can result in different types of damage, from burns or pitting in wind turbine blades to one or more of the damage categories discussed above, including delamination, for example.

Ice accumulation: in some environments, ice may accumulate on different parts of a turbine blade. Ice accumulation may occur because of freezing precipitation, or because of ice crystals in the air, among other things. There are various consequences to ice accumulation. For example, added weight from the ice may cause strain on different turbine components. As another example, water can get between layers of composite material and, when the water expands through formation as ice, can cause the layers to separate. In an embodiment, depending on the volume of the ice accumulation, ice detection on one or more wind turbine blades may prompt inspection of interior workings of a wind turbine, in order to anticipate damage from strain on components. In an embodiment, when wind turbine blades shed ice, it may be desirable to inspect the blades to see if the ice shedding caused one or more of the damage categories discussed above.

In an embodiment, the model may be an instance segmentation model, but in different non-limiting embodiments the model could be a classification model, a classification and localization model an object detection model, or a semantic segmentation model. The model may be built using a convolutional neural network (CNN) architecture. In an embodiment, the CNN may be a region based CNN (R-CNN), and may be a Mask R-CNN. In an embodiment, Other CNNs, such as Fast R-CNN, or other CNNs, may be employed. In an embodiment, a regional proposal network may be employed, alone or in combination with a Fast R-CNN network. In an embodiment, CNNs that run better on GPUs rather than on CPUs may be employed.

In an embodiment, various machine learning architectures may be used for instance segmentation models, depending on task goals and requirements. Examples include various versions of YOLO (You Only Look Once). As a real-time object detection model, YOLO may make tradeoffs unfavorable to the objectives of the system in applications such as the one to which embodiments of the present invention are directed because of YOLO's real time nature, which can provide speed at the expense of accuracy. Taking into account the relative infrequency of blade inspections, in an embodiment the focus may be on accuracy more than on speed.

Another example of an instance segmentation model would include various versions of Segment Anything (SAM), including SAM, SAM 2, FastSAM, or SAM-CLIP (where CLIP stands for "Contrastive Language-Image Pre-training").

For purposes of accuracy, an architecture such as Mask R-CNN may be suitable for image segmentation. In an embodiment, where scaling might be desirable, for example, to obtain a more detailed picture of an item of damage in an image, a feature known as feature pyramid network (FPN) may be used, to provide a multiple-scale representation of the image, with feature levels at different spatial resolutions. For object detection, an architecture such as Fast R-CNN may be suitable. In embodiments, model retraining may be desirable for various reasons. For example, data labeling could change, or different types of blade images under different conditions may become available.

Figure 3:
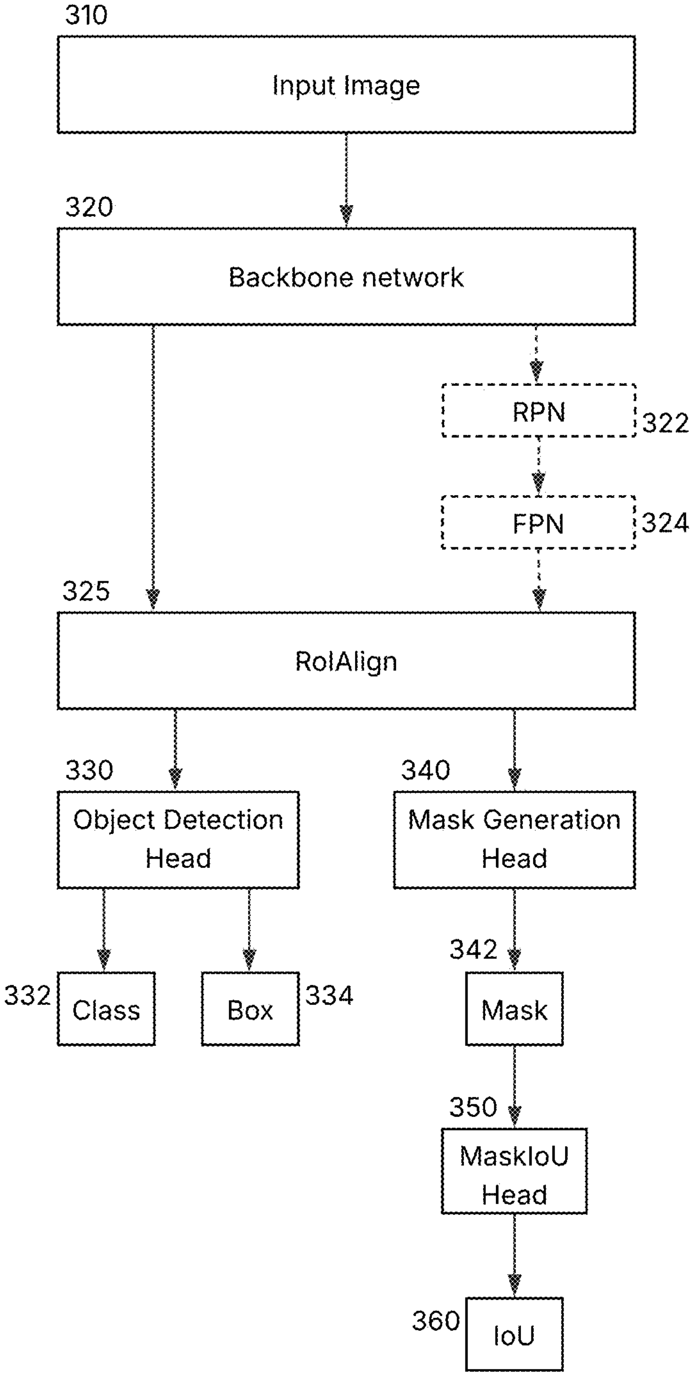
FIG. 3 is a high level block diagram depicting structure and operation of a machine learning model according to an embodiment.

Looking at FIG. 3, in an embodiment, input images 310 may be fed into a backbone network 320 to generate RoIs. In an embodiment, RoIs and RoI features may be generated via Region of Interest Align, or RoIAlign. RoIAlign is an operation for extracting a small feature map from each RoI in detection and segmentation based tasks. In an embodiment, RoIs may be generated via a region proposal network (RPN) and/or a feature proposal network (FPN) and RoI features may be generated via RoIAlign 320. In an embodiment, object detection head 330 and mask generation head 340 may be components of Mask R-CNN. Object detection head 330 may extract features from RoIAlign 320, generate classifications 332 and bounding boxes 334 for each RoI.

Mask generation head 340 provides a predicted segmentation mask to MaskIoU head 350, which compares that predicted segmentation mask with the ground truth mask to generate an IoU value 360.

In an embodiment, to predict MaskIoU, a predicted mask and RoI feature may be input. In an embodiment, the MaskIoU head may have 4 convolution layers (all of which may have kernel=3, with the final layer using stride=2 for downsampling) and 3 fully connected layers (the final one of which outputs C classes MaskIoU.)

In embodiments, an architecture of the model may be based on Mask R-CNN. In an embodiment, the architecture may be based on Mask Scoring R-CNN. In different embodiments and/or different applications, different custom heads for the model may be used. For example, in the case of a Mask R-CNN model, a FastRCNNPredictor may be provided to classify and localize defects. A MaskRCNNPredictor may be provided to generate binary segmentation masks. In embodiments, either or both custom heads may be configured to detect and distinguish between specific damage categories, including but not limited to the ones discussed and described herein.

Figure 4:
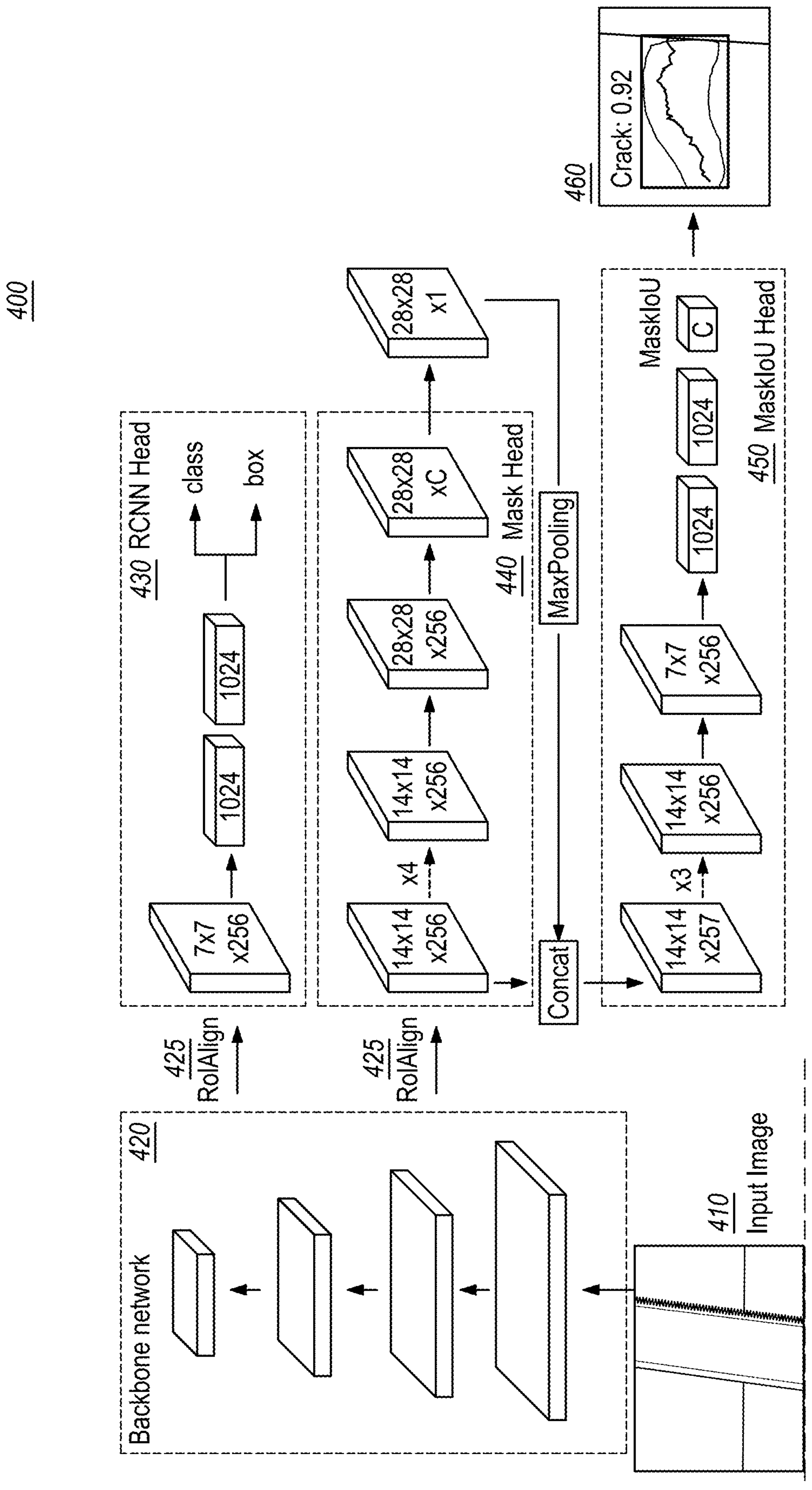
FIG. 4 is a high level block diagram depicting exemplary structure of a machine learning model according to an embodiment.

Looking at FIG. 4, in an embodiment, a backbone network 420 may be an initial layer in the Mask R-CNN architecture. The backbone network may transform a raw input image 410 into a rich representation of its visual features by extracting relevant features from the input image. In an embodiment, a backbone network may have multiple convolutional layers, pooling operations and other non-linear operations to enable capturing information from low level to high-level in the image. In an embodiment, the backbone network, which may be a ResNet (Residual Network) or ResNext (Residual Network with Aggregated Transformations) network, may extract hierarchical convolutional feature maps from the input image 410. In some embodiments, a feature pyramid network (FPN) may be coupled to the backbone to construct multi-scale feature maps from the backbone features.

In an embodiment, a region proposal network (RPN) (not shown in FIG. 4) may operate on feature maps from the backbone or the FPN, and may generate candidate regions of interest using a set of predetermined anchor boxes at multiple different scales and aspect ratios.

In an embodiment, the RPN may assign a score to each region proposal to signify resemblance to a real object. A high score for a region proposal may imply likely presence of an object of interest within the proposed region. A low score may imply that the region is background or does not contain any relevant object.

In an embodiment, Mask R-CNN may incorporate a Feature Pyramid Network (FPN) (not shown in FIG. 4) to address a possible issue of multi-scale feature representation. In an embodiment, the FPN may construct a feature pyramid by merging features from different layers of a convolutional neural network such as backbone network 420. This pyramid structure may provide a multi-scale representation of the image, with feature levels at different spatial resolutions.

As described herein, in an embodiment FPN occurs after RPN. However, in an embodiment the sequence may be reversed.

In an embodiment, the RPN may consume the FPN features to produce proposals for regions of interest. RolAlign 425 then may sample fixed-size feature tensors for each proposal from an appropriate FPN level using bilinear interpolation and without quantization, to improve alignment at object boundaries.

In an embodiment, once region proposals are generated and aligned using RolAlign, Mask R-CNN may perform classification and bounding box regression in R-CNN head network 430, which in an embodiment may be a Fast R-CNN predictor. RolAlign features may be used to predict class probabilities for each proposed region. In an embodiment, regression of coordinates of bounding boxes may be performed to refine positions and sizes of the bounding boxes. In an embodiment, this regression may provide more accurate object classification and more precise localization, and may be useful in obtaining damage locations in wind turbine blades accurately.

In an embodiment, a mask head 440 may be responsible for generating pixel-level masks for each detected object region. In an embodiment, the mask head network 440 may take the Rol-aligned features as input and pass them through a series of convolutional layers and upsampling operations to produce the final segmentation masks. In an embodiment, a mask prediction branch, which may include a binary mask classifier, may predict whether each pixel belongs to the foreground (object) or background. In an embodiment, the output may be a high-resolution mask for each object instance, to provide more accurate delineation of object boundaries.

In an embodiment, a MaskIoU head (IoU signifying intersection over union) 450 receives an output of mask head 440, and generates an IoU image 460. IoU, a value between 0 and 1, is known to ordinarily skilled artisans as a performance metric to evaluate accuracy of models, including the various annotation, segmentation, and/or object detection algorithms. IoU may signify a degree of overlap between the predicted bounding box or segmented region and the ground truth bounding box or annotated region from a dataset. The larger the IoU, the more accurate the model. In FIG. 4, output IoU image 460 shows a value of 0.92 for a crack, indicating a degree to which a predicted bounding box overlaps with the ground truth bounding box.

In an embodiment, various parameters may be fine-tuned using a hyperparameter tuning tool such as Optuna. Ordinarily skilled artisans will appreciate that tools such as Ray Tune, GridSearchCV, RandomSearchCV, Hyperopt, or others may be suitable, depending on the environment. In an embodiment, hyperparameters that may be fine-tuned may include learning rate, momentum, decay, batch size for training and/or testing, shuffle or permutation test, gamma or a variation thereof, and/or step size. Ordinarily skilled artisans will recognize that other hyperparameter tuning tools may be used, and/or other parameters may be fine-tuned in addition to or as alternatives to the parameters just listed.

In an embodiment, varying numbers of hidden layers in the machine learning model may be included. Some may be trainable, and some may be frozen. Ordinarily skilled artisans will appreciate that there may be varying numbers of hidden layers.

In an embodiment, a distributed computing platform such as Databricks may be employed to enable scalable training of machine learning models on large volumes of wind turbine blade imagery. Databricks provides managed compute clusters that support parallelized model training across multiple GPUs or CPUs, which reduces overall training time and facilitates processing of high-resolution images at scale, wherein the machine learning model is trained using a distributed computing environment that allocates model training across multiple compute nodes or GPUs.

In some embodiments, image datasets may be loaded into the Databricks environment in compressed formats and organized using frameworks such as Mosaic Streaming, which supports storage in shard-based formats to reduce I/O latency during training.

While Databricks is one example of a scalable compute and data processing environment, other platforms that support distributed training, such as those from Microsoft, Amazon, Google, Oracle, SAP, IBM, or Cloudera, may also be employed.

In an embodiment, the Label Studio platform may be used to label data. Ordinarily skilled artisans will appreciate that other labeling facilities such as Amazon SageMaker Ground Truth, Roboflow, Scale AI, Encord, or others may be used, depending on the application.

In different embodiments, different manipulations of images may be employed. In an embodiment, grayscaled images may be used for training to accelerate the training process. In an embodiment, distributed training across multiple GPUs may be used for training to make the process more efficient. In an embodiment, it will be possible to provide and receive feedback from the end-user on whether a blade had damage, resulting in a reinforcement learning solution which will enable the model to improve and adapt as damage types evolve, or as serial defects are identified in certain types of wind turbines and/or in certain locations.

In an embodiment, the system and method may implement a background semantic segmentation model. In an embodiment, background segmentation may be performed before damage assessment, to mask the background in a blade or turbine image, to reduce or eliminate the possibility that background (sky, trees, etc.) may be mistaken for a turbine.

In an embodiment, images may be broken into smaller pieces containing areas to be scrutinized for damage, and the system trained on those smaller images. Using smaller images may make training more efficient. In an embodiment, variants of the kind of damage that can occur on wind turbine blades may be used, in order to broaden the training range for the system. In this approach, care should be taken not to make the training range for a given type of damage too broad, as the result could be training that is inaccurate and/or very time consuming. In an embodiment, an example of a variant may be cracks in different materials, such as cement, metal, or plastic. Such variants may be used to augment training data in an attempt to improve accuracy by introducing a wider variety of crack variation into training.

In an embodiment, damaged areas of a blade in a photograph may have the pixels in that area highlighted. In an embodiment, highlighted pixels may have a box drawn around them. In an embodiment, a probability score between 0 and 1 may be provided to indicate a likelihood that one of the itemized categories of damage is present. In an embodiment, the system may output the image with the boxed highlighted pixels and accompanying damage predictions. In an embodiment, different damage types may be delineated with different colors, or different shapes around the highlighted pixels, or other techniques which ordinarily skilled artisans will appreciate. In an embodiment, the entire image, at full size, may be saved with indications of which blade portions should be reviewed in greater detail for potential damage.

If damage is identified on the wind turbine blade, a course of action for repair or replacement may be recommended.

Figure 5:
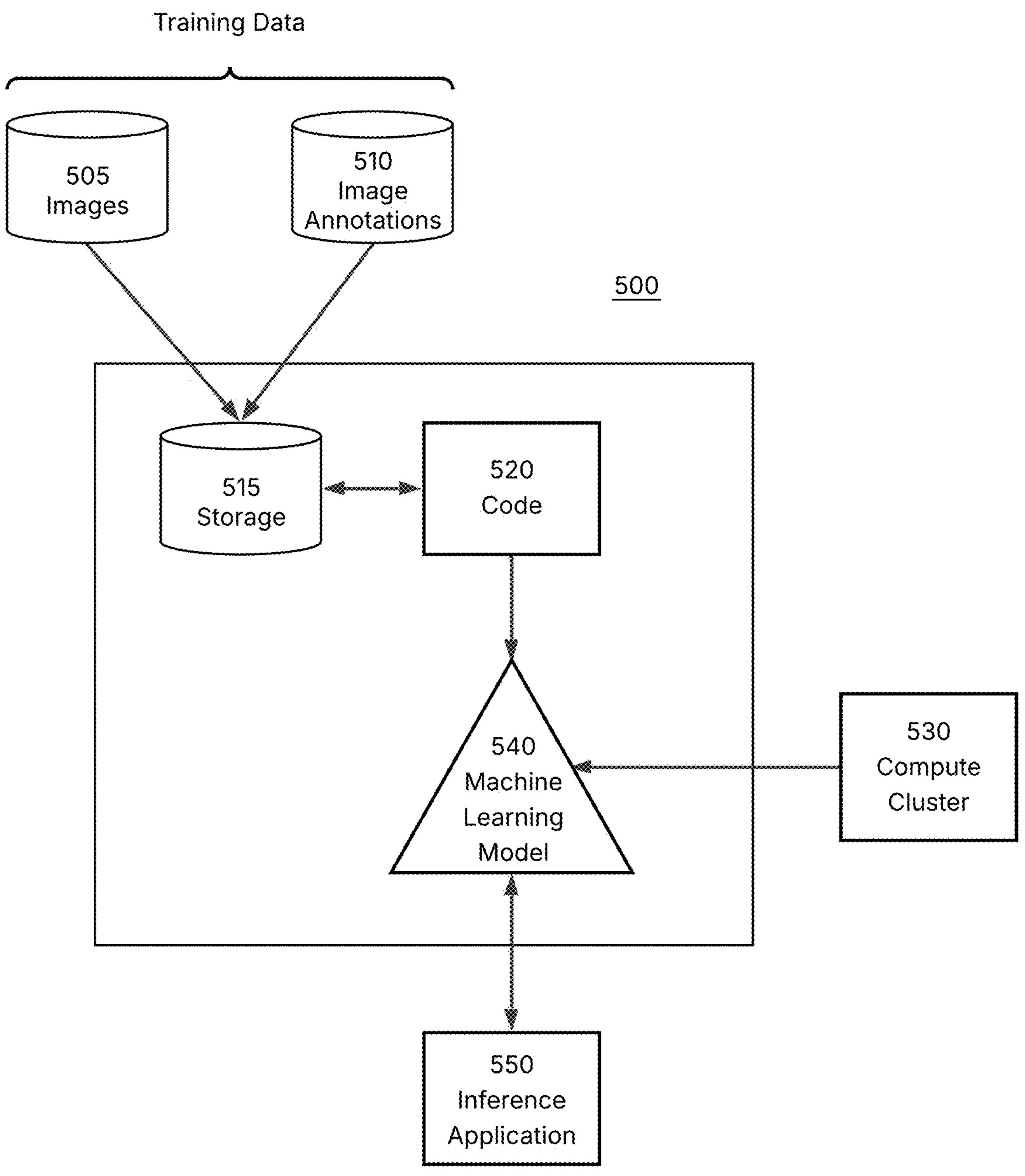
FIG. 5 is a high level block diagram of a system to implement a machine learning model according to an embodiment.

FIG. 5 is a high level block diagram which depicts an embodiment of a computer system that can perform various embodiments of the methods disclosed herein. Computer system 500, which in an embodiment may be a cloud computing system, receives as inputs training data taken from a set of images 505 (which may be training images or images to be analyzed). Further inputs to computer system 500 may include labels or annotations 510 for each image in the set of images 505, where the images are training images. Further inputs to computer system 500 may include delineations of boundaries around damage or defect(s) in the training images, where the delineations may be bounding boxes, polygons, or masks. In an embodiment, each annotation 510 specifies, for each instance of damage within the image, the damage type (class label) as well as delineations of the boundaries of the damage or defect(s), represented by bounding boxes, polygons, or masks. An individual image may contain multiple instances of damage, potentially spanning different damage types, and each such instance is separately annotated. In an embodiment, image storage 515 receives images 505 and corresponding annotations 510, including the damage type (class label) and any associated bounding boxes, polygons, or masks.

In some embodiments, the images and annotations further may be organized into folders corresponding to different damage categories. In an embodiment, transformations may be applied to the incoming images to provide an augmented set of images. As noted earlier, the transformations may comprise one or more of mirroring, rotation, smoothing, magnification, size reduction, contrast reduction, horizontal inversion, and vertical inversion. In an embodiment, the transformations are performed within image storage 515 before being applied via code 520 to machine learning model 540. In an embodiment, a program such as PyTorch, TensorFlow, or Keras may be part of code 520 to apply the transformations, either beforehand or on the fly, to prepare the image data from image storage 515 for input to machine learning model 540.

In an embodiment, machine learning model 540 may be trained leveraging compute from compute cluster 530, which may comprise a plurality of processors (CPUs and/or GPUs) which may be connected to each other either directly (that is, by a hardwired, wireless, or cellular network), or over the cloud. In an embodiment, compute cluster 530 may comprise a plurality of distributed GPU clusters. In an embodiment, an architecture of machine learning model 540 may comprise one or more of the architectures described earlier.

In an embodiment, one or more of the processors in compute cluster 530 may be associated with memory which contains instructions for training a machine learning model. In an embodiment, one or more of the processors in compute cluster 530 may be associated with memory which contains instructions for applying the trained machine learning model. In an embodiment, one or more of the processors in compute cluster 530 may be associated with memory which contains instructions for both training the machine learning model and applying the trained machine learning model.

In an embodiment, compute cluster 530 may be employed to train machine learning model 540, using the code 520. Once the machine learning model 540 is trained, an inference application 550 may apply the trained model to new inspection images to detect and segment damage or defects. The volume and speed of the detection and segmentation far exceeds capabilities of individuals, and can yield more accurate results more promptly. For example, the trained model may be able to look at sequences of images of a given wind turbine blade at different angles and distances and interpret the image sequences to detect damage or defects, or, in some cases, to predict damage or defects in the wind turbine blade. In an embodiment, inference application 550 may recommend repairs. In an embodiment, inference application may recommend or instruct wind turbine shutdown to allow for maintenance, repair, or replacement, or to prevent additional damage to a wind turbine blade.

Aspects of the present invention are set out in the following clauses:

CLAUSE 1. A computer-implemented method comprising:
- collecting a set of digital wind turbine blade images from a database, wherein at least some of the digital wind turbine blade images show a wind turbine blade with one or more defects or one or more instances of damage;
- applying at least one transformation, selected from the group consisting of mirroring, rotation, smoothing, magnification, size reduction, contrast reduction, horizontal inversion, and vertical inversion, to the set of digital wind turbine blade images to create an augmented set of digital wind turbine blade images;
- for identified images in the modified set of digital wind turbine blade images that show damage or defect, applying at least one label to each of said identified images to provide a labeled augmented set of digital wind turbine blade images;
- using one or more delineations selected from the group consisting of bounding boxes, polygons, and masks to outline the one or more defects or one or more instances of damage in each of said identified images and produce a set of outlined defects;
- creating an annotation file comprising the labels in the labeled augmented set of digital wind turbine blade images and the set of outlined defects;
- creating a first training set comprising the annotated modified set of digital wind turbine blade images, the annotation file, and a set of digital wind turbine blade images which do not show damage; and training a machine learning model using the first training set.

CLAUSE 2. Method according to clause 1, further comprising applying background segmentation to the collected set of digital wind turbine blade images to separate wind turbine blades in the images from their respective backgrounds.

CLAUSE 3. Method according to clause 1, further comprising:

creating a second training set comprising the first training set and a set of digital wind turbine blade images incorrectly identified as showing damage during training; and further training the machine learning model using the second training set.

CLAUSE 4. Method according to clause 3, further comprising:

creating a third training set comprising the second training set and a set of digital wind turbine blade images incorrectly identified as not showing damage during training; and further training the machine learning model using the third training set.

CLAUSE 5. Method according to clause 1, wherein the one or more instances of damage are selected from the group consisting of fatigue, cracks, impact, delamination, leading edge erosion, holes, splits, lightning strikes, and ice accumulation.

CLAUSE 6. Method according to clause 1, wherein training the machine learning model further comprises:

using a Fast R-CNN predictor to classify and localize defects; and using a Mask R-CNN predictor to generate binary segmentation masks, to define regions of interest (Rols) in an image;

wherein the method further comprises outputting the trained machine learning model.

CLAUSE 7. Method according to clause 6, further comprising applying the trained machine learning model to new sets of digital wind turbine blade images and outputting a damage or defect assessment for each image in the new sets of digital wind turbine blade images.

CLAUSE 8. Method according to clause 6, wherein training the machine learning model further comprises:

fine-tuning the Fast R-CNN predictor, and using the fine-tuned Fast R-CNN predictor to classify and localize defects;

fine-tuning the Mask R-CNN predictor, and using the fine-tuned Mask R-CNN predictor to generate binary segmentation masks, to define regions of interest (Rols) in an image.

CLAUSE 9. Method according to clause 1, wherein the set of digital wind turbine images comprise multiple images of wind turbine blades from different angles and distances to provide multiple views of a given damage or defect.

CLAUSE 10. Method according to clause 1, wherein the set of digital wind turbine images comprise multiple images of wind turbine blades under different atmospheric conditions to provide multiple views of a given damage or defect.

CLAUSE 11. Apparatus comprising a processor and a memory storing instructions which, when executed by the processor, perform a method comprising:

collecting a set of digital wind turbine blade images from a database, wherein at least some of the digital wind turbine blade images show a wind turbine blade with one or more defects or one or more instances of damage;

applying at least one transformation, selected from the group consisting of mirroring, rotation, smoothing, magnification, size reduction, contrast reduction, horizontal inversion, and vertical inversion, to the set of digital wind turbine blade images to create an augmented set of digital wind turbine blade images;

for identified images in the modified set of digital wind turbine blade images that show damage or defect, applying at least one label to each of said identified images to provide a labeled augmented set of digital wind turbine blade images;

using one or more delineations selected from the group consisting of bounding boxes, polygons, and masks to outline the one or more defects or one or more instances of damage in each of said identified images and produce a set of outlined defects;

creating an annotation file comprising the labels in the labeled augmented set of digital wind turbine blade images and the set of outlined defects;

creating a first training set comprising the annotated modified set of digital wind turbine blade images, the annotation file, and a set of digital wind turbine blade images which do not show damage; and training a machine learning model using the first training set.

CLAUSE 12. Apparatus according to clause 11, further comprising applying background segmentation to the collected set of digital wind turbine blade images to separate wind turbine blades in the images from their respective backgrounds.

CLAUSE 13. Apparatus according to clause 11, further comprising:

creating a second training set comprising the first training set and a set of digital wind turbine blade images incorrectly identified as showing damage during training; and further training the machine learning model using the second training set.

CLAUSE 14. Apparatus according to clause 13, further comprising:

creating a third training set comprising the second training set and a set of digital wind turbine blade images incorrectly identified as not showing damage during training; and further training the machine learning model using the third training set.

CLAUSE 15. Apparatus according to clause 11, wherein the one or more instances of damage are selected from the group consisting of fatigue, cracks, impact, delamination, leading edge erosion, holes, splits, lightning strikes, and ice accumulation.

CLAUSE 16. Apparatus according to clause 11, wherein training the machine learning model further comprises:

using a Fast R-CNN predictor to classify and localize defects; and using a Mask R-CNN predictor to generate binary segmentation masks, to define regions of interest (Rols) in an image;

wherein the method further comprises outputting the trained machine learning model.

CLAUSE 17. Apparatus according to clause 16, further comprising applying the trained machine learning model to new sets of digital wind turbine blade images and outputting a damage or defect assessment for each image in the new sets of digital wind turbine blade images.

CLAUSE 18. Apparatus according to clause 16, wherein training the machine learning model further comprises:

fine-tuning the Fast R-CNN predictor, and using the fine-tuned Fast R-CNN predictor to classify and localize defects;

fine-tuning the Mask R-CNN predictor, and using the fine-tuned Mask R-CNN predictor to generate binary segmentation masks, to define regions of interest (RoIs) in an image.

CLAUSE 19. Apparatus according to clause 16, wherein the set of digital wind turbine images comprise multiple images of wind turbine blades from different angles and distances to provide multiple views of a given damage or defect.

CLAUSE 20. Apparatus according to clause 16, wherein the set of digital wind turbine images comprise multiple images of wind turbine blades under different atmospheric conditions to provide multiple views of a given damage or defect.

Although various illustrative embodiments are described above, any of a number of changes may be made to various embodiments without departing from the scope of the invention as described by the claims. For example, optional features of various device embodiments may be included in some embodiments and not in others. Therefore, the foregoing description is provided primarily for exemplary purposes and should not be interpreted to limit the scope of the invention as it is set forth in the claims.

What is claimed is:

1. A computer-implemented method comprising:

collecting a set of digital wind turbine blade images from a database, wherein at least some of the digital wind turbine blade images show a wind turbine blade with one or more defects or one or more instances of damage;

applying at least one transformation, selected from the group consisting of mirroring, rotation, smoothing, magnification, size reduction, contrast reduction, horizontal inversion, and vertical inversion, to the set of digital wind turbine blade images to create an augmented set of digital wind turbine blade images;

for identified images in the modified set of digital wind turbine blade images that show damage or defect, applying at least one label to each of said identified images to provide a labeled augmented set of digital wind turbine blade images;

using a bounding box and a mask to outline each instance of damage or defect in each of said identified images and produce a set of outlined defects, wherein each instance of damage or defect is separately delineated from other instances of damage or defect in the image, each instance being associated with a corresponding bounding box and a corresponding mask defining a region of interest for that instance;

creating an annotation file comprising the labels in the labeled augmented set of digital wind turbine blade images and the set of outlined defects;

creating a first training set comprising the labeled augmented set of digital wind turbine blade images, the annotation file, and a set of digital wind turbine blade images which do not show damage; and training a machine learning model using the first training set.

2. Method according to claim 1, further comprising applying background segmentation to the collected set of digital wind turbine blade images to separate wind turbine blades in the images from their respective backgrounds.

3. Method according to claim 1, further comprising:

creating a second training set comprising the first training set and a set of digital wind turbine blade images incorrectly identified as showing damage during training; and further training the machine learning model using the second training set.

4. Method according to claim 3, further comprising:

creating a third training set comprising the second training set and a set of digital wind turbine blade images incorrectly identified as not showing damage during training; and further training the machine learning model using the third training set.

5. Method according to claim 1, wherein the one or more instances of damage are selected from the group consisting of fatigue, cracks, impact, delamination, leading edge erosion, holes, splits, lightning strikes, and ice accumulation.

6. Method according to claim 1, wherein training the machine learning model further comprises:

using a Fast R-CNN predictor to classify and localize defects; and using a Mask R-CNN predictor to generate binary segmentation masks, to define regions of interest (RoIs) in an image;

wherein the method further comprises outputting the trained machine learning model.

7. Method according to claim 6, further comprising applying the trained machine learning model to new sets of digital wind turbine blade images and outputting a damage or defect assessment for each image in each of the new sets of digital wind turbine blade images.

8. Method according to claim 6, wherein training the machine learning model further comprises:

fine-tuning the Fast R-CNN predictor, and using the fine-tuned Fast R-CNN predictor to classify and localize defects;

fine-tuning the Mask R-CNN predictor, and using the fine-tuned Mask R-CNN predictor to generate binary segmentation masks, to define regions of interest (RoIs) in an image.

9. Method according to claim 1, wherein the set of digital wind turbine images comprise multiple images of wind turbine blades from different angles and distances to provide multiple views of a given damage or defect.

10. Method according to claim 1, wherein the set of digital wind turbine images comprise multiple images of wind turbine blades under different atmospheric conditions to provide multiple views of a given damage or defect.

11. Apparatus comprising a processor and a memory storing instructions which, when executed by the processor, perform a method comprising:

collecting a set of digital wind turbine blade images from a database, wherein at least some of the digital wind turbine blade images show a wind turbine blade with one or more defects or one or more instances of damage;

applying at least one transformation, selected from the group consisting of mirroring, rotation, smoothing, magnification, size reduction, contrast reduction, horizontal inversion, and vertical inversion, to the set of digital wind turbine blade images to create an augmented set of digital wind turbine blade images;

for identified images in the modified set of digital wind turbine blade images that show damage or defect, applying at least one label to each of said identified images to provide a labeled augmented set of digital wind turbine blade images;

using a bounding box and a mask to outline each instance of damage or defect in each of said identified images and produce a set of outlined defects, wherein each instance of damage or defect is separately delineated from other instances of damage or defect in the image, each instance being associated with a corresponding bounding box and a corresponding mask defining a region of interest for that instance;

creating an annotation file comprising the labels in the labeled augmented set of digital wind turbine blade images and the set of outlined defects;

creating a first training set comprising the labeled augmented set of digital wind turbine blade images, the annotation file, and a set of digital wind turbine blade images which do not show damage; and training a machine learning model using the first training set.

12. Apparatus according to claim 11, further comprising applying background segmentation to the collected set of digital wind turbine blade images to separate wind turbine blades in the images from their respective backgrounds.

13. Apparatus according to claim 11, further comprising:

creating a second training set comprising the first training set and a set of digital wind turbine blade images incorrectly identified as showing damage during training; and further training the machine learning model using the second training set.

14. Apparatus according to claim 13, further comprising:

creating a third training set comprising the second training set and a set of digital wind turbine blade images incorrectly identified as not showing damage during training; and further training the machine learning model using the third training set.

15. Apparatus according to claim 11, wherein the one or more instances of damage are selected from the group consisting of fatigue, cracks, impact, delamination, leading edge erosion, holes, splits, lightning strikes, and ice accumulation.

16. Apparatus according to claim 11, wherein training the machine learning model further comprises:

using a Fast R-CNN predictor to classify and localize defects;

using a Mask R-CNN predictor to generate binary segmentation masks, to define regions of interest (RoIs) in an image;

wherein the method further comprises outputting the trained machine learning model.

17. Apparatus according to claim 16, further comprising applying the trained machine learning model to new sets of digital wind turbine blade images and outputting a damage or defect assessment for each image in each of the new sets of digital wind turbine blade images.

18. Apparatus according to claim 16, wherein training the machine learning model further comprises:

fine-tuning the Fast R-CNN predictor, and using the fine-tuned Fast R-CNN predictor to classify and localize defects;

fine-tuning the Mask R-CNN predictor, and using the fine-tuned Mask R-CNN predictor to generate binary segmentation masks, to define regions of interest (RoIs) in an image.

19. Apparatus according to claim 16, wherein the set of digital wind turbine images comprise multiple images of wind turbine blades from different angles and distances to provide multiple views of a given damage or defect.

20. Apparatus according to claim 16, wherein the set of digital wind turbine images comprise multiple images of wind turbine blades under different atmospheric conditions to provide multiple views of a given damage or defect.

* * * * *